United States Patent [19]

Eisdorfer et al.

[11] Patent Number: 5,893,903
[45] Date of Patent: Apr. 13, 1999

[54] MULTIMEDIA MESSAGE SYSTEM WITH REVENUE ALLOCATION

[75] Inventors: Allen Eisdorfer, Woodbridge; Jerry Eisdorfer, Somerset; Andreas Constantine Papanicolaou, Lincroft, all of N.J.

[73] Assignee: AT&T Corp., Middletown, N.J.

[21] Appl. No.: 08/772,199

[22] Filed: Dec. 20, 1996

[51] Int. Cl.[6] .............................................. G60F 151/00
[52] U.S. Cl. ............................... 705/1; 705/8; 705/403
[58] Field of Search .................................. 705/1, 35, 40, 705/8, 30, 403; 395/200.75; 379/88.22, 88.23; 380/20.23 C, 20.24 H

[56] References Cited

U.S. PATENT DOCUMENTS

| | | | |
|---|---|---|---|
| 4,853,864 | 8/1989 | Hart et al. | 380/705 |
| 4,873,645 | 10/1989 | Hunter et al. | 380/364 |
| 4,907,161 | 3/1990 | Sansone et al. | 705/403 |
| 4,947,333 | 8/1990 | Sansone et al. | 705/403 |
| 5,006,983 | 4/1991 | Wayne et al. | 705/8 |
| 5,010,571 | 4/1991 | Katznelson | 380/4 |
| 5,247,575 | 9/1993 | Sprague et al. | 380/9 |
| 5,617,539 | 4/1997 | Lugwig et al. | 395/200.35 |
| 5,625,690 | 4/1997 | Michel et al. | 380/4 |
| 5,633,916 | 5/1997 | Goldhagen et al. | 379/67 |
| 5,689,641 | 11/1997 | Ludwig et al. | 395/200.71 |
| 5,740,230 | 4/1998 | Vaudreuil | 379/88 |
| 5,754,306 | 5/1998 | Taylor et al. | 358/400 |

Primary Examiner—Allen R. MacDonald
Assistant Examiner—Romain Jeanty

[57] ABSTRACT

The Multimedia Message System of the present invention provides revenue allocation between disparate sender-receiver service providers on a per message basis for a sender, connected to a telecommunications network of one service provider, sending a message to a receiver, connected to a telecommunications network of another service provider. Each message has a "message stamp" associated with it which allows for distribution of revenue associated with that individual message among service providers involved for transmission of that message. A Clearinghouse is utilized to issue the message stamps and process revenue allocation for each service provider according to the message stamps. The stamp is added to each message by the clearinghouse to provide for revenue allocation between the originating (sender) and destination (receiver) service providers. Removal or canceling of the stamp is performed by the destination unit that may additionally route the message to a mailbox (e.g., service node) or further destination service providers. The stamp revenue is shared by the message sender service provider, the stamp issuer, and message receiver service provider, the collector of the used/canceled stamp. The canceled stamp may be exchanged or redeemed between the service providers via their respective clearinghouses, for currency or additional stamps according to a predetermined revenue sharing arrangement between participating service providers.

23 Claims, 6 Drawing Sheets

| CLEARINGHOUSE TREATMENT ROUTING | | | |
|---|---|---|---|
| MENU-IDENTIFIER | STEP | ADMINISTRATION IDENTIFIER | IDENTIFIER ERROR |
| A1 | 1 | NODE-QUERY DB FOR USES MAILBOX | |
| A1 | 2 | NODE-QUERY DB FOR INFO MATCHING USER MAILBOX | |
| A2 | 1 | NODE-QUERY USER FOR USER MAILBOX INFORMATION | |
| A2 | 2 | NODE-QUERY DB FOR USER STAMP INFORMATION | |
| B1 | 1 | NODE-QUERY DB FOR STAMP | |
| B1 | 2 | NODE-SEND ACKNOWLEDGEMENT MESSAGE | |
| B2 | 1 | NODE-QUERY DB FOR PRIORITY STAMP | |
| B2 | 2 | NODE-SEND ACKNOWLEDGEMENT MESSAGE | |
| C1 | 1 | NODE-QUERY DB FOR CLEARINGHOUSE PROFILE | |
| C1 | 2 | NODE-QUERY DB FOR INFO MATCHING MAILBOX INFORMATION | |
| C1 | 3 | NODE-QUERY DB FOR INFO MATCHING STAMP INFORMATION | |
| C2 | 1 | NODE-QUERY DB FOR NEXT AVAILABLE STAMP | |
| C3 | 1 | NODE-QUERY DB FOR CANCELED STAMPS | |
| C3 | 2 | NODE-PROCESS CANCELED STAMPS | |
| | 1 | NODE-SEND ERROR MESSAGE | E1 |
| | 2 | NODE-TERMINATE COMMUNICATION SESSION | E2 |

MULTIMEDIA MESSAGE SYSTEM WITH REVENUE ALLOCATION

BACKGROUND OF THE INVENTION

1. Technical Field

This invention relates generally to multimedia message systems, and more particularly, to a method and system for implementing allocation of message revenue.

2. Related Background Art

Multimedia and Electronic mail (or "e-mail") message systems allow transmission of messages between computer-based users connected on a telecommunication network. Depending on the capabilities of a particular message system, graphics, audio, or simple text messages can be sent between these users.

Figure 1:
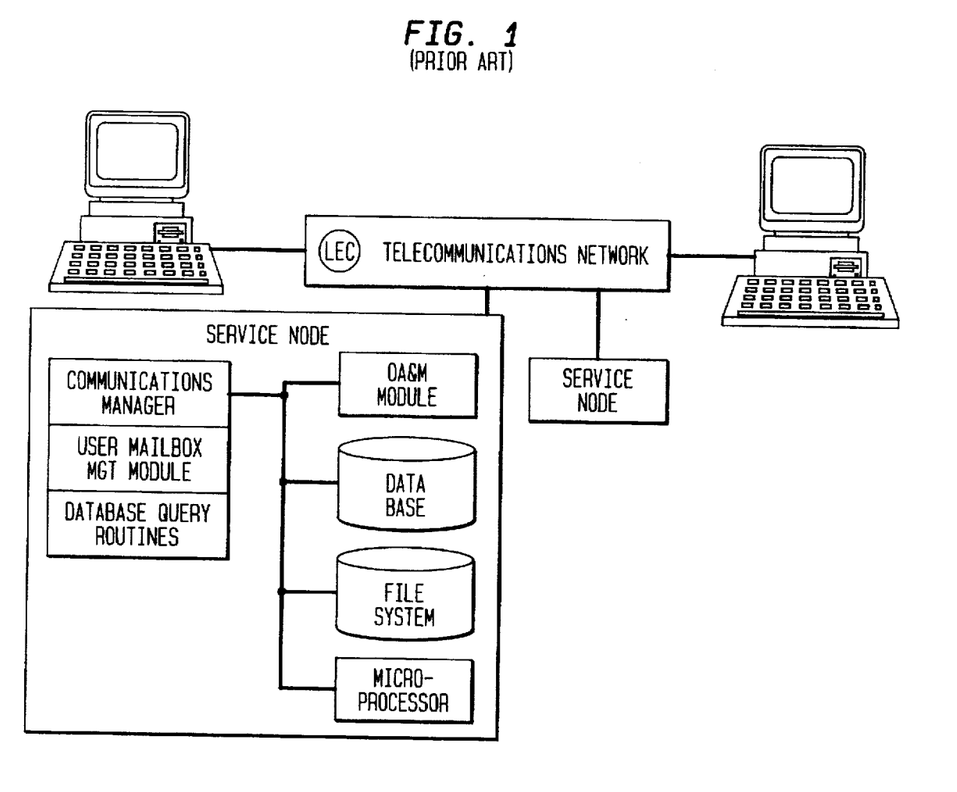
FIG. 1 illustrates prior art e-mail system implementation.

One common known message system is configured so that both sender and receiver are hosted by the same network, either a local-area-network ("LAN") or a network offered by a single service provider, as shown in FIG. 1. In these systems, communications, in the form of messages will occur between the sender, where the message originates, and the receiver, which is the message destination. Normally communications costs for e-mail messages are born by both sender and receiver for access to their respective mailboxes in the e-mail system. The sender pays some type of usage fee for access to an e-mail system on which he can send (and receive) messages. The receiver pays a similar usage fee for access to an e-mail system on which he can receive (and send) messages. On a per message basis, the sender bears a cost for sending a message, and the receiver bears a similar cost for retrieving the message.

When both sender and receiver were hosted by the same service provider's telecommunication network, allocation of payment for a particular message between sender and receiver had not been an issue.

As inter-network e-mail has come into widespread use, developments in the art have accommodated limited re-allocation of e-mail revenue between the disparate service providers involved in transmission of a particular message. For example, one such known development provides for designation of a "paying party" to pay the entire cost of the communication as opposed to having both the sender and receiver pay a fee. In this known technique, the sender of an e-mail message can designate whether the sender would bear the entire cost of the message (i.e., revenue to the sender's service provider) or if the receiver was to be responsible for payment upon accepting the e-mail message (i.e., revenue to the receiver's service provider) of the entire cost.

While offering improvement over the traditional system where the sender pays, these known methods of and systems for revenue accounting accommodate only an all or nothing division of revenue—i.e., either the sender or the receiver pays the entire cost of the e-mail message, accruing the entire revenue to one telecommunications network service provider. This suffers the inherent limitation that only either the service provider acting as host to either the sender and receiver will receive the full benefit of payment with nothing going to the other service provider.

As is evident from the foregoing, limitations in known methods limit the effectiveness, and therefore the utility, of the current level of advancement achieved in the area of e-mail revenue accounting.

SUMMARY OF THE INVENTION

Limitations of known multi-media mail revenue accounting methods and systems are resolved and technical advances are achieved by the present invention of a method and system for allocating revenue distribution on a per message basis. Allocation can be varied through any range among any or multiple service providers involved in delivery of the subject message, including the sender's host service provider, the receiver's host service provider and any intermediary service providers or networks involved in forwarding a message to its destination.

In one illustrative embodiment, the method and system of the present invention provide for utilizing a clearinghouse to allocate revenue between service providers through use of message stamps. The clearinghouse, resident in a sender service provider in one embodiment, will issue the message stamp containing information including identification information identifying the clearinghouse and the sender service provider. The stamp is associated with the message and transmitted to a clearinghouse in the receiver service provider. The stamp content is modified by the clearinghouse in the receiver service provider to include information identifying the receiving provider and sent back to the sender service provider where the clearinghouse disassociates the stamp, processes the information contained in the stamp and allocates revenue accordingly.

Other advantages and features of the present invention will become apparent in view of the following detailed description of the illustrative and alternative embodiments of the present invention.

BRIEF DESCRIPTION OF DRAWINGS

The following drawings are referenced in the detailed description which follows and are provided to facilitate a better understanding of the invention disclosed herein.

DETAILED DESCRIPTION OF THE PREFERRED EMBODIMENTS

Figure 2:
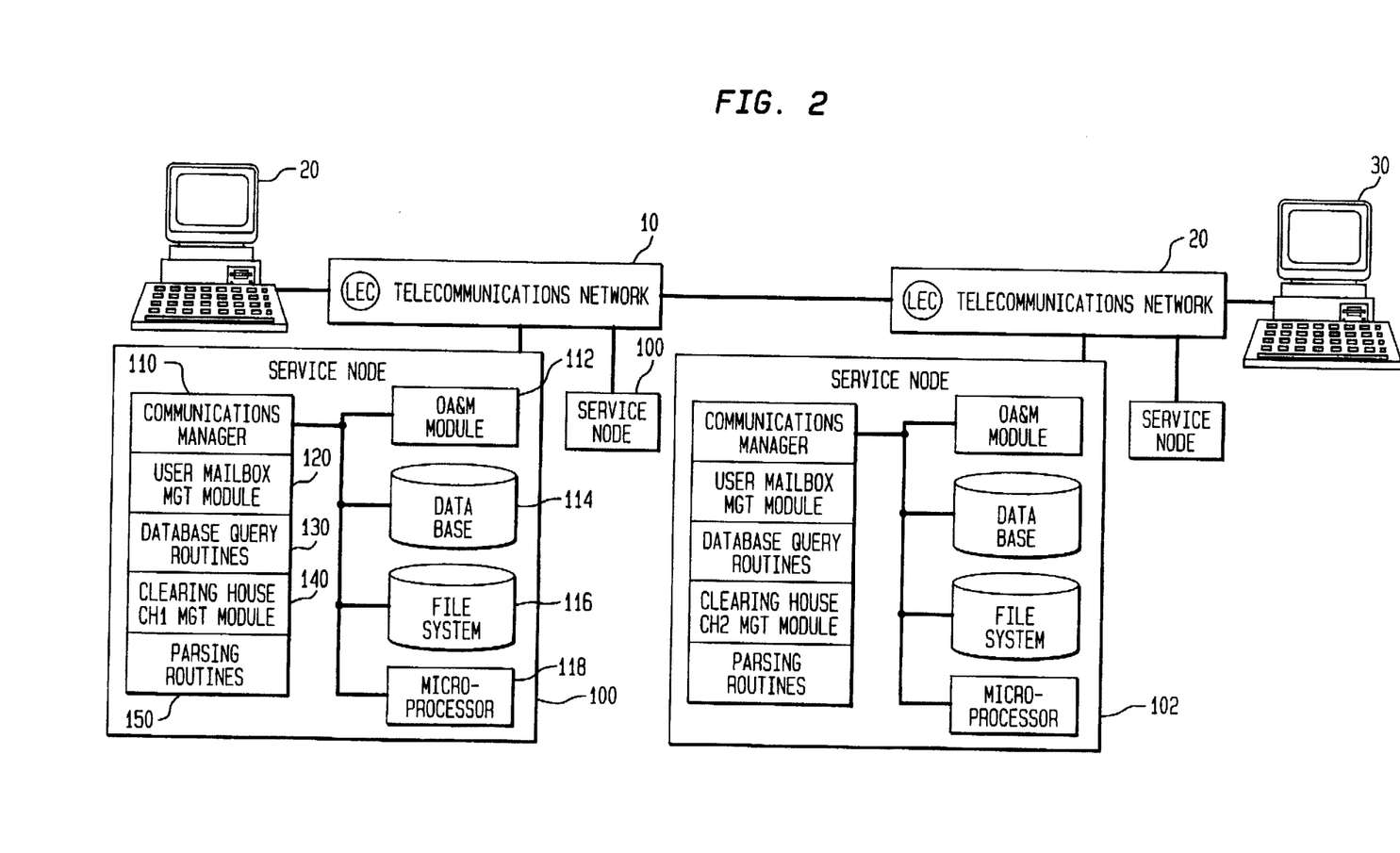
FIG. 2 illustrates the e-mail system implementation according to one embodiment of the present invention.

FIG. 2 illustrates the present invention according to one embodiment thereof.

The Multimedia Message System as described with respect to the exemplary embodiment of the present invention, provides revenue allocation between disparate sender-receiver service providers on a per message basis for a user 20, connected via a personal computer ("PC") to a telecommunications network of one service provider 10, i.e., the sender, sending a message to a user 30, connected via a PC on a telecommunications network of another service provider 200, i.e., the receiver.

According to the present invention, each message has a "message stamp" associated with it which allows for distribution of revenue associated with that individual message among service providers involved for transmission of that message. In the illustrative embodiment of the present invention, a "Clearinghouse" is utilized to issue the message stamps and process revenue allocation for each service provider according to the message stamps.

Generally, multimedia mail from a sender originating from equipment (e.g., switch or intelligent processor) of one service provider's ("originating service provider") telecommunications network and having a destination to a receiver at equipment of another service provider's ("destination service provider") telecommunications network requires appropriate originator (sender) payment to be made prior to placing the message in the destination service provider's mailbox.

According to the present invention, the stamp is added to each message by the clearinghouse to provide for revenue allocation between the originating (sender) and destination (receiver) service providers. Removal or canceling of the stamp is performed by the destination unit that may additionally route the message to a mailbox (e.g., service node) or further destination service providers. The stamp revenue is shared by the message sender service provider, the stamp issuer, and message receiver service provider, the collector of the used/canceled stamp. The canceled stamp may be exchanged or redeemed between the service provider via their respective clearinghouses, for currency or additional stamps according to a predetermined revenue sharing arrangement between participating service providers.

While the illustrative embodiments discussed herein involve e-mail systems, the invention is equally applicable to other computer based message systems such as multimedia message systems.

According to this exemplary embodiment, a Service Node 100 of telecommunications network 10 (in this embodiment a local exchange carrier or "LEC") is configured to comprise a Communications Manager 110, a User Mailbox Management Module 120, Database Query Routines 130, Clearinghouse Management Module 140, and Parsing Routines 150. Communications Manager 100, is in communication with OA&M Module 112, Database 114, File System 116 and Microprocessor 118.

The Communications Manager 110 serves as the communications interface between the user of the LEC 10 and the Service Node 100.

The OA&M Module 112 is tasked to perform Operation, Administration and Maintenance routines that administer the service node 100.

Database 114 is used to store information, including mailbox information for each user (sender and receiver), stamp status (e.g., "canceled" or "usable") for the clearinghouse, allocated revenue accounts for participating service providers and revenue allocation arrangements (in, for example, algorithm form).

File System 116 contains the information and programs necessary to control and operate the service node.

Microprocessor 118 has access to information stored in database 114.

The User Mailbox Management Module 120 provides a user mailbox and usage information necessary for administration and billing for each user.

Database Query Routines 130 provide access to user data for each user and clearinghouse data for the service node clearinghouse, both of which are contained in database 114.

Clearinghouse Management Module 140 provides a clearinghouse mailbox and stamp information necessary for clearinghouse administration and billing and also provides sending messages for priority processing (e.g. priority stamp) to each appropriate user.

Parsing Routines 150, run by the Clearinghouse Management Module 140 form stamps for messages including such information segments as identification of originating (sender) service provider and user (sender and receiver) mailbox information. The routines combine the stamp and message and send the stamped message forward to the destination service provider. The parsing routines run in a clearinghouse for a receiving service provider segment the information received with each incoming e-mail message back into "message", "mailbox information" and "stamp" categories. The stamp information is thereby disassociated from the message. The parsing routines then store the message (based on the extracted mailbox information) and stamp in the appropriate portion of the database 114.

The manner in which a message stamp is associated with an individual message is not critical to the present invention. Known methods for attaching shipping data with header data or a timestamp as part of header data are known in various protocols. Having a header with fields, as well as the concept of packing and unpacking data is known as well.

After the stamps have been disassociated from the incoming message, they are processed by the clearinghouse. While one clearinghouse can service multiple service providers and users, in the exemplary embodiment, one clearinghouse CH1 is resident in the originating (sending) service provider network 100 and one clearinghouse CH2 is resident in the destination (receiving) service provider network 102.

In the illustrative embodiment, clearinghouses CH1 and CH2 coordinate revenue allocation between their respective service providers based on a predetermined arrangement between those providers as to the revenue allocation.

To accomplish the revenue split, each stamp carries certain information to assist in the revenue allocation.

In one embodiment, CH1 sends to CH2 the message with associated stamp. CH2 disassociates the stamp and message and delivers the message as requested by CH1. CH2 after disassociating the stamp, CH2 sends back a stamp modified to include its identity, for CH1 authentication. CH1 will then send payment to CH2 according to the predetermined revenue allocation arrangement.

Explained in greater detail, the sending clearinghouse CH1 will identify itself as the issuing clearinghouse on the stamp. The clearinghouse identity information is sent unencrypted so that text showing the identity of clearinghouse CH1 is plainly available. Using known encryption techniques, such as for example, Federal Standard 1016 public key encryption technique, cyphertext showing a revenue sharing and stamp code is generated.

After clearinghouse CH2, the receiving clearinghouse, has received the message and disassociated the stamp, the stamp is modified by clearinghouse CH2 to include its identity as the receiving service provider. The modified stamp is then returned to CH1.

CH1 authenticates the cyphertext part and to identify and confirm the stamp code on the returned stamp. As per the allocation arrangement with CH2, CH1 will credit (i.e., "make payment to") an account set up on behalf of CH2 in a database accessible to the CH1.

In this embodiment, the format of the multi-media stamp is a "two-state stamp", having two states: canceled and uncanceled. The used stamp is "canceled" by CH1 after "payment" to CH2. In this example, the stamp is thus used as a method of payment to CH1 and then canceled by CH1 because it is not used again. This canceled stamp can be recycled by CH1, the issuing clearinghouse to be issued to a subsequent requesting user.

In an alternative embodiment, the message may be addressed to a receiver on another receiving service provider having a clearinghouse CH3. In that case, after being modified by CH2, now an intermediate clearinghouse, the stamp would not be returned to CH1 until modified by CH3 as well. CH1 would then credit account for CH2 and CH3 as appropriate, prior to canceling the message stamp.

In yet other embodiments, the functions described for the two clearinghouse implementation of the illustrative embodiment can be implemented within one clearinghouse serving all participating sending and receiving service providers as will be understood by one of skill in the art. In an embodiment where only one clearinghouse is used, further routing capabilities would be incorporated so as to rout messages from the sending to receiving service providers as will be understood by one of skill in the art. These alternative embodiments nor any variations hereon should be construewn to depart from the scope of the present invention.

Operation of the present embodiment will now be described in greater detail beginning with FIG. 3.

A user (i.e., sender) 20 (FIG. 2) wishing to send a message to a another user (i.e., receiver) 30 (FIG. 2) must first establish communication with his e-mail system hosted on his host service node 100 (FIG. 2). FIG. 3 illustrates one method for the user's (sender or receiver) establishing communications with the service node hosting the e-mail system in this embodiment of the present invention.

A user at PC 20 establishes a communication session with the service node 100 ("Node") in step 300. (Note: When communication is indicated "to" or "with" the "node", such communication in this embodiment is effected through the communications manager 110, FIG. 2. As such, in references herein to communication with or by the node, "node" or "communication manager" are used interchangeably unless indicated otherwise.)

Figure 3:
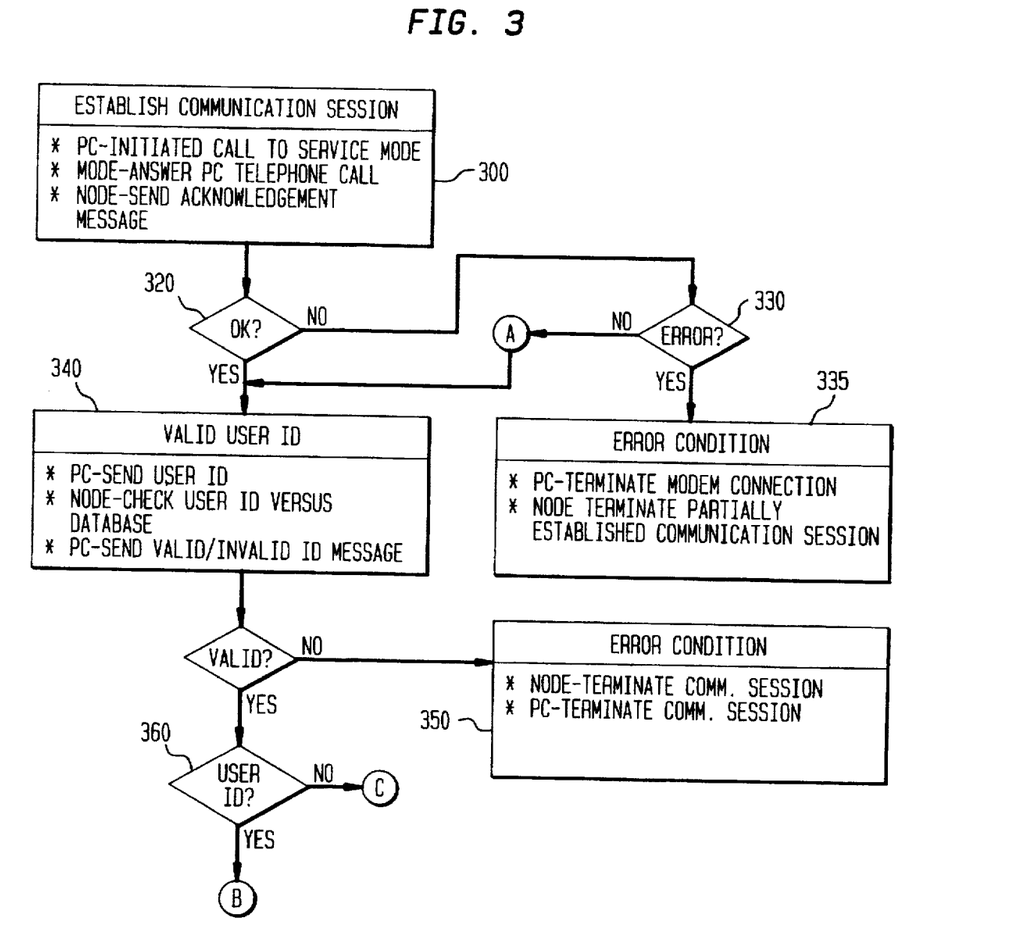
FIG. 3 illustrates a flow chart for establishment of communication session with a service node according to one embodiment of the present invention.

Step 300 in this embodiment comprises three sub-steps (a)–(c) as shown in FIG. 3.

In sub-step (a), a PC-initiated call is placed by the user 20 to node 100. In sub-step (b), the node 100 answers the call from PC 20. In sub-step (b), node 100 sends a challenge message to PC 20 to elicit further response from PC 20. In sub-step (c), in response to the challenge message, PC 20 sends an acknowledgement message back to node 100.

A determination is then made by the communications manager 110 of node 100 at step 320 whether communications has been established.

If communications has not been successfully established, a determination is then made in step 330 whether any error has been detected during the attempt to establish communications in step 300.

Where an error is detected in step 330, the flow continues to error handling in step 335 to handle the detected error. In sub-step (a) of step 335, PC 20 terminates the modem connection on its end. In sub-step (b), communications manager 110 terminates the partially established communication session.

Figure 4:
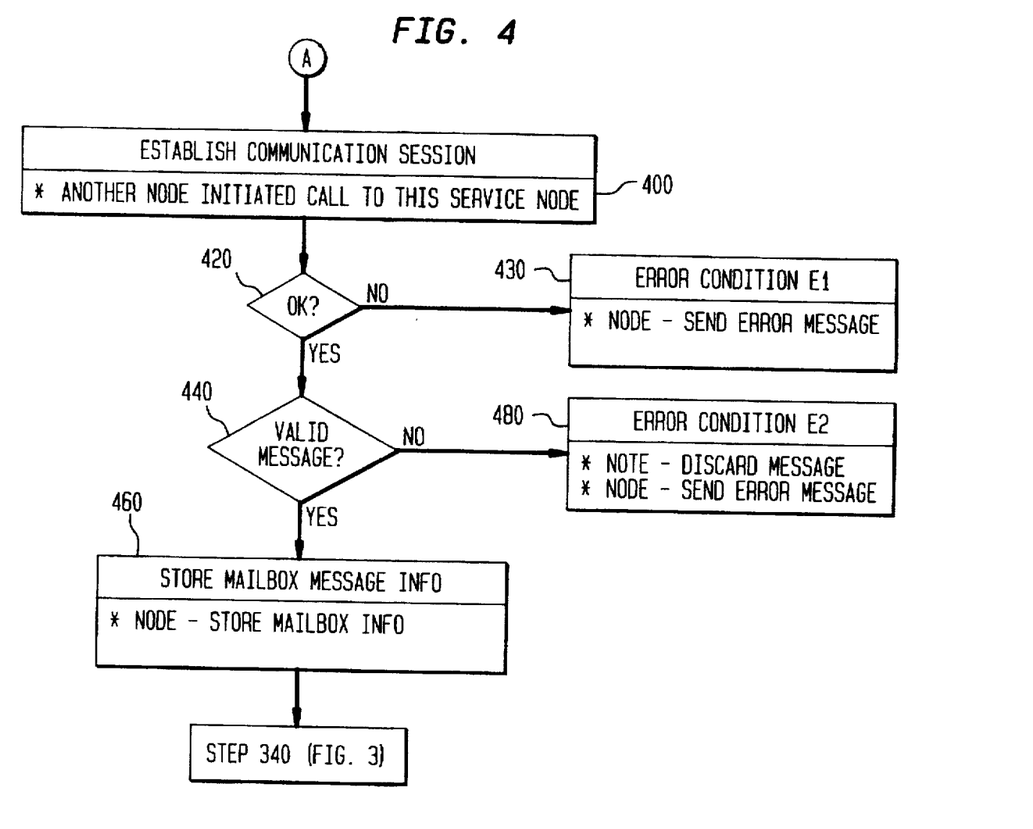
FIG. 4 illustrates a continuation of the flow chart of FIG. 3 where communication has not been successfully established.

If no error is detected in step 330, the flow continues to A, FIG. 4. In FIG. 4, a new attempt is made to establish a communication session to Node 100 in step 400, via another node initiated call to the service node. A determination at step 420 is made whether communications have been established on this attempt. If not successfully established, Node 100 will post an error message, step 430. If successful, the received acknowledgement message is scrutinized for validity in step 440. If valid, the Node then stores mailbox information for that user in step 460. If invalid, the node will discard the e-mail message and post an error message in step 480.

Referring again to FIG. 3, when communication has been successfully established (step 300, FIG. 3), the flow continues to Validate USER's ID in step 340. Step 340 comprises four sub-steps (a)–(d).

In sub-step (a), PC 20 send its USER ID to communications manager 110 at node 100. Communications manager 110 then checks, in sub-step (c), the USER ID to determine if it is valid. This is done utilizing the appropriate Database Query Routines 130 (FIG. 2) available to the communications manager 110 on node 100.

Figure 5:
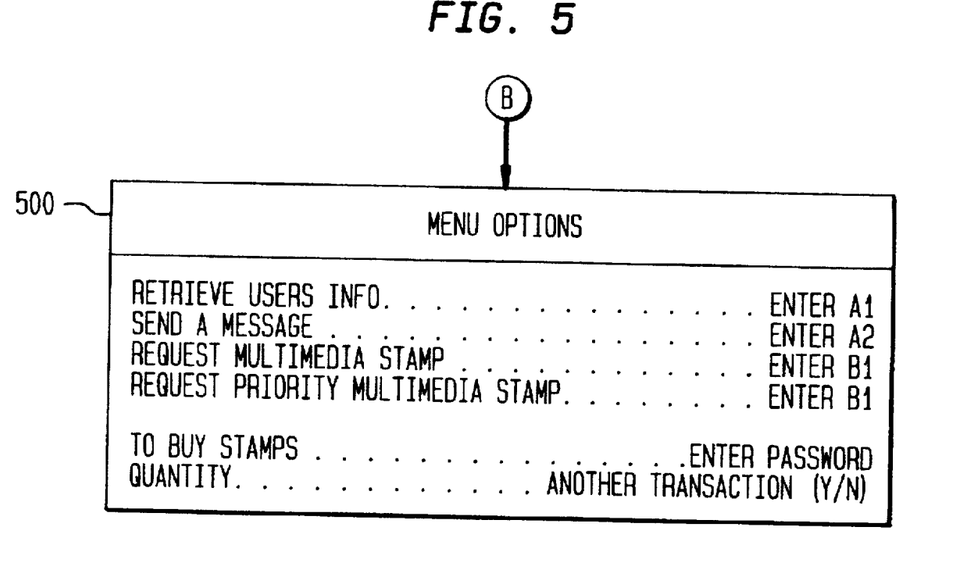
FIG. 5 illustrates a continuation of the flow chart of FIG. 3 where a valid individual user identification has been determined.

The USER ID received from PC 20 is compared to valid USER ID's stored in database 114 in node 100. In sub-step (c), communication manager 110 posts a "VALID ID" or "INVALID ID" message to PC 20, as appropriate.

Where the USER ID is determined INVALID, the flow continues to handle the invalidity error in step 350. In sub-step (a) of step 350, Node 100 initiates to termination of the communication session. In sub-step (b), PC 20 terminates the communication session on its end.

Where the USER ID is determined VALID, the flow continues to step 360 to evaluate the USER ID information. The USER ID can identify a user wishing to send or receive a message, i.e., an individual user, or the clearinghouse.

Where the USER ID identifies an individual user desiring to send or retrieve a message, the flow continues to B (step 500), FIG. 5. Where USER ID identifies the clearinghouse, the flow continues to C (step 600), FIG. 6. (in this embodiment of the present invention for purposes of explanation it is assumed that the user is an individual so as to more readily distinguish from a clearinghouse user, however, it will readily be understood that other categories of users also apply.)

In FIG. 5, a verified individual user is presented with a menu offering several options, according to this embodiment, which are made available to that user. These options include options to:

(a) Retrieve User's Info;

(b) Send A Message;

(c) Request Multimedia Message Stamp;

(d) Request Priority Multimedia Message Stamp;

(e) Buy Message Stamp; and, (f) Request Another Transaction.

The individual options will now be explained in greater detail.

Option (a)—Retrieve User's Info

A user, by selecting this option, will be provided information regarding their mailbox, for example, if there are any waiting messages, how many stamps are currently available to the user, etc. E-mail messages can be retrieved from this option as well.

Option (b)—Send A Message

A user can select to formulate and send an e-mail message by this option. Destination of message is entered, along with the desired message.

Option (c)—Request Multimedia Message Stamp

A user can request a multimedia stamp from prepurchased (available) message stamps to be appended (post- or pre-) to the e-mail message to be sent. (See option (e)

below.) (A simple analogy can be drawn to putting a postage stamp on a letter to be mailed at a conventional Post Office.)

Option (d) Request Priority Multimedia Message Stamp

Where a user desires expedited delivery of the e-mail message, a priority multimedia stamp can be selected from pre-purchased message stamps to be appended (post- or pre-) to the e-mail message.

Option (e) Buy Multimedia Message Stamp

A user can select to buy a specified quantity of multimedia message stamps, both normal and priority stamps) from the service provider's clearinghouse for use on future e-mail messages. (An analogy for illustrative purposes can be drawn to buying a book of postage stamps from the local Post Office.) As the user's account with the service provider will be charged for stamp purchases, stamp purchases on the user's account can be password protected. (Other schemes, such as directly charging a credit card account for the stamp cost can be incorporated in other embodiments of the present invention.)

Option (f) Request Another Transaction

After performing any of options (a)–(e), a user is queried as to whether they have any further transactions they wish to complete. If so, the menu of step 500 is displayed once again. If not, then the e-mail system is exited.

Figure 6:
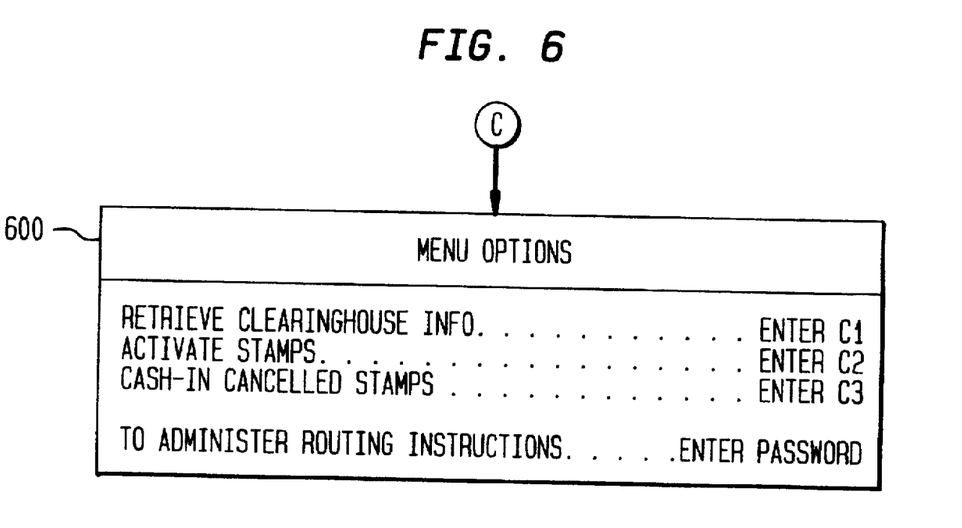
FIG. 6 illustrates a continuation of the flow chart of FIG. 3 where a valid clearinghouse user identification has been determined.

In FIG. 6, a clearinghouse user is presented with a menu 600 offering options available to the clearinghouse user. These options include options to:

(a) Retrieve Clearinghouse Info;

(b) Activate Message Stamps;

(c) Cash-in Canceled Message Stamp; and, (d) Administer Message Routing Instructions.

The individual options will now be explained in greater detail.

Option (a) Retrieve Clearinghouse Info

A clearinghouse user, by selecting this option, will be provided information regarding clearinghouse information, for example, the amount of active stamps assigned to an individual users, status of used stamps, canceled stamp information, responses from individual user's requests for stamps, etc.

Option (b) Activate Message Stamps

In response to a request for a stamp by an individual user (option (e), FIG. 5), the clearinghouse user can activate stamps for use by the requesting individual, assigned to the requester's mailbox. This is similar to selling a book of stamps to an individual user.

Option (c) Cash-in Canceled Message Stamp

Stamps which have been disassociated from incoming e-mail messages by the parsing routines 150 (FIG. 2) run by the clearinghouse management module 140 (FIG. 2) are tabulated according to the percentage due to each clearinghouse (i.e., service provider) involved with the delivery of each message to mailboxes hosted on that server in a fashion similar to accounts receivable and accounts payable register. Requests for payment for accounts receivable are then posted to the appropriate outside clearinghouses and payments for accounts payable are made to the appropriate other clearinghouses.

Option (d) Administer Message Routing Instructions

In this step, message routing information is provided by the user (likely the system manager). This information includes: the location of the multimedia stamps (i.e., where they are held until used); the location from where the messages are retrieved (prior to placing on a stamp and being sent); and the location of where the sent messages are placed (e.g., the mailbox network address).

The error conditions in FIG. 4 have corresponding error condition identifiers, i.e., E1, E2, associated with each error condition detected in the communication process, and FIG. 5 and 6 menu options have menu identifiers associated with each menu option entry, i.e. A1, A2, B1, B2 etc. These identifiers correlate administration action at the service node required for the detected error condition or selected menu option. The entirety of the menu-identifiers and error condition codes from FIGS. 4, 5 and 6 of this embodiment, are set forth in FIG. 7.

Figure 7:
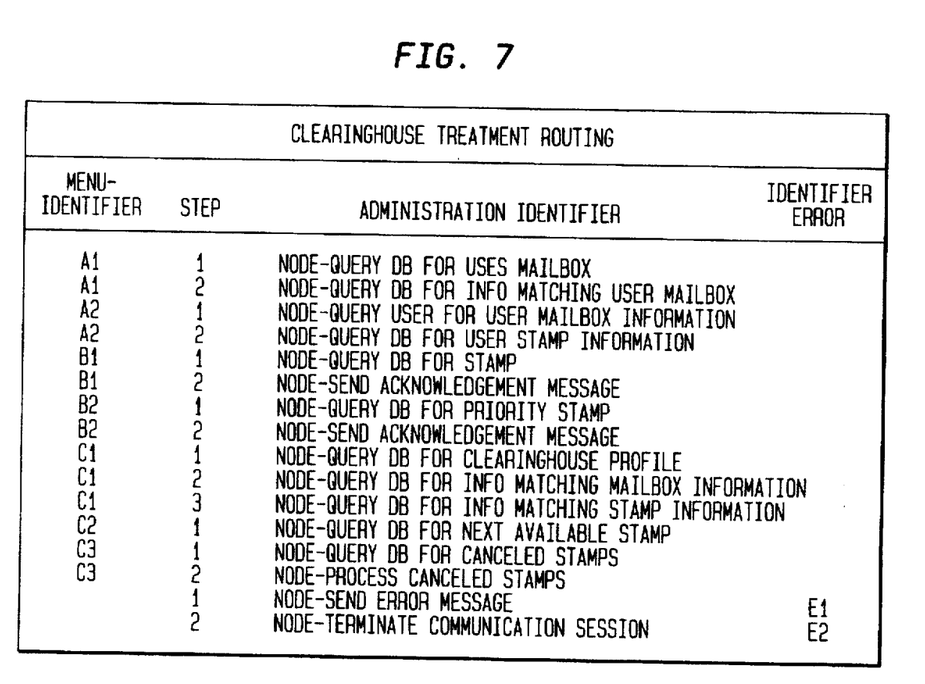
FIG. 7 illustrates clearinghouse operation for the functions of FIGS. 5 and 6.

For example, if option (a) of FIG. 5 to retrieve user's information is selected, this option is associated with menu identifier A1. Referring to FIG. 7, menu identifier A1 corresponds to Administration identifiers requiring the Node 100 (1) to query the database 114 for the user's mailbox; and (2) to query the database 114 for information matching the user mailbox.

While the default condition of implementation of the present invention according to the illustrative embodiment will simply drop an invalid message or one that cannot be forwarded as addressed without notification to the sender, other embodiments of the present invention allow the message to be sent back to the originating destination if it can not be delivered. A "return to sender" message may be added by any device or software in the message path, although in the preferred embodiment, this would be performed by the communications manager of the service node.

Another embodiment of this invention allows alternate processing of stamps based on stamp cost—i.e., various implementations of expedited delivery requests in conjunction with priority stamps. The default condition of the illustrative embodiment of the present invention simply places the message in the receiver mailbox. Additional processing where a priority stamp is used may include informing the user of the message, e.g., send the user a voice message or notifying the recipient by beeper.

When an e-mail message must pass through a series of intermediate networks to reach the destination address, if all networks use the same e-mail format, a gateway is used to translate the format of the e-mail message from one network into one that the next network can understand. Along its journey to the final destination, intermediate routers and gateways open each e-mail packet to determine destination address, read the message stamp and forward to the next stage (either another intermediate unit or destination network). In one embodiment, each intermediate unit can be equipped with a clearinghouse according to the present invention. Or, in yet another embodiment, a central single clearinghouse to which a number of network service providers belong can allocate payment to each network provider that participated in the delivery of any message.

The present invention has been illustrated and described with respect to specific exemplary embodiments thereof. It will be readily understood, however, that the above-described embodiments are merely illustrative of the principles of the invention and are not intended to be exclusive or otherwise limiting embodiments. It should further be understood that the foregoing and many various modifications, omissions and additions may be devised by one skilled in the art without departing from the spirit and scope of the invention.

We claim:

1. A multimedia message system for transmitting an electronic message from a sender to a receiver, said message system comprising:

a sender service provider allowing said sender access to said message system;

a receiver service provider allowing said receiver access to said message system;

a clearinghouse, in communication to said sender service provider and said receiver service provider;

a message stamp, issued by said clearinghouse to said sender service provider and processed by said clearinghouse, said stamp containing information including revenue allocation data and identification information identifying said clearinghouse and said sender service provider, wherein said message stamp is associated with said message to be transmitted by said clearinghouse, resulting in a stamped message to be transmitted to said receiver service provider, said stamped message is sent from said sender service provider to said receiver service provider, said clearinghouse disassociates said stamp, said identification information contained in said stamp issued to said sender service provider by said clearinghouse is then modified by said sender service provider to also contain information identifying said receiver service provider, the modified stamp is returned to said sender service provider where said modified identification information is processed.

2. The multimedia message system of claim 1 wherein after said processing, revenue is allocated according to a revenue allocation arrangement and said revenue allocation results are stored in a database.

3. The multimedia message system of claim 1 wherein said sender service provider and said receiver service provider are the same.

4. The multimedia message system of claim 1 wherein said clearinghouse resides in said sender service provider.

5. The multimedia message system of claim 1 wherein said clearinghouse resides in said receiver service provider.

6. The multimedia message system of claim 1 wherein said clearinghouse resides in each of said sender service provider and said receiver service provider.

7. The multimedia message system of claim 1 wherein when said clearinghouse disassociates said stamp from said stamped message, said clearinghouse authenticates said stamp, retrieves said identification information from said stamp and cancels said stamp.

8. A clearinghouse for a multimedia message system for transmitting a message comprising:

issuing means for issuing a message stamp containing information regarding said message;

means for associating said message stamp to said message;

processing means for retrieving information from said issued stamp and canceling said stamp; and means for routing said message received from a sender to a receiver.

9. The clearinghouse of claim 8 wherein said processing means includes means for authenticating said stamp.

10. The clearinghouse of claim 8 further comprising means for tabulating and storing said information retrieved from said processed stamp.

11. The clearinghouse of claim 10 wherein said accounting means for tabulating and storing said information retrieved from said processed stamp also generates an information summary statement.

12. The clearinghouse of claim 8 wherein said message stamp is a two-state message stamp, said two-states being canceled and uncanceled.

13. The clearinghouse of claim 12 wherein said routing of said stamped message is part of said processing means.

14. The clearinghouse of claim 8 wherein said stamp, issued to said service provider by said clearinghouse, is associated with said message by said sender service provider, resulting in a stamped message to be transmitted to said receiver service provider, said stamped message being routed from said sender service provider to said receiver service provider, said clearinghouse disassociates said stamp, processes information retrieved from said stamp and forwards message to said receiver service provider.

15. A method for transmitting an electronic message from a sender to a receiver in a multimedia message system comprising the steps of:

allowing said sender access to said message system via a sender service provider;

allowing said receiver access to said message system via a receiver service provider;

issuing a message stamp by a clearinghouse, said stamp containing information including revenue allocation data and information identifying said clearinghouse and said sender service provider;

modifying the contents of said stamp to include identifying information identifying said receiving service provider; and processing said modified message stamp.

16. The method of claim 15 further comprising the steps of:

associating said stamp with said message;

routing said message to said receiving service provider; and disassociating said stamp from said message.

17. The method of claim 15 further including the steps of:

maintaining an account and storing message delivery information in said account.

18. The method of claim 15 further including the step of returning the modified message stamp to the issuing clearinghouse.

19. The method of claim 17 wherein said steps of modifying the contents of said stamp, processing said modified message stamp, associating said stamp with said message, routing said message to said receiving service provider, disassociating said stamp from said message and maintaining an account and storing message delivery information in said account are preformed in a clearinghouse.

20. The method of claim 15 wherein said sender service provider and said receiver service provider are the same.

21. The method of claim 15 wherein said clearinghouse resides in said sender service provider.

22. The method of claim 18 wherein said clearinghouse resides in said receiver service provider.

23. The method of claim 18 further including the step of authenticating said stamp.

* * * * *